Jan. 5, 1954    G. C. HEIN ET AL    2,664,604
AIR CONDITIONING APPARATUS AND LIQUID METERING DEVICE
Filed Jan. 21, 1950    3 Sheets-Sheet 1
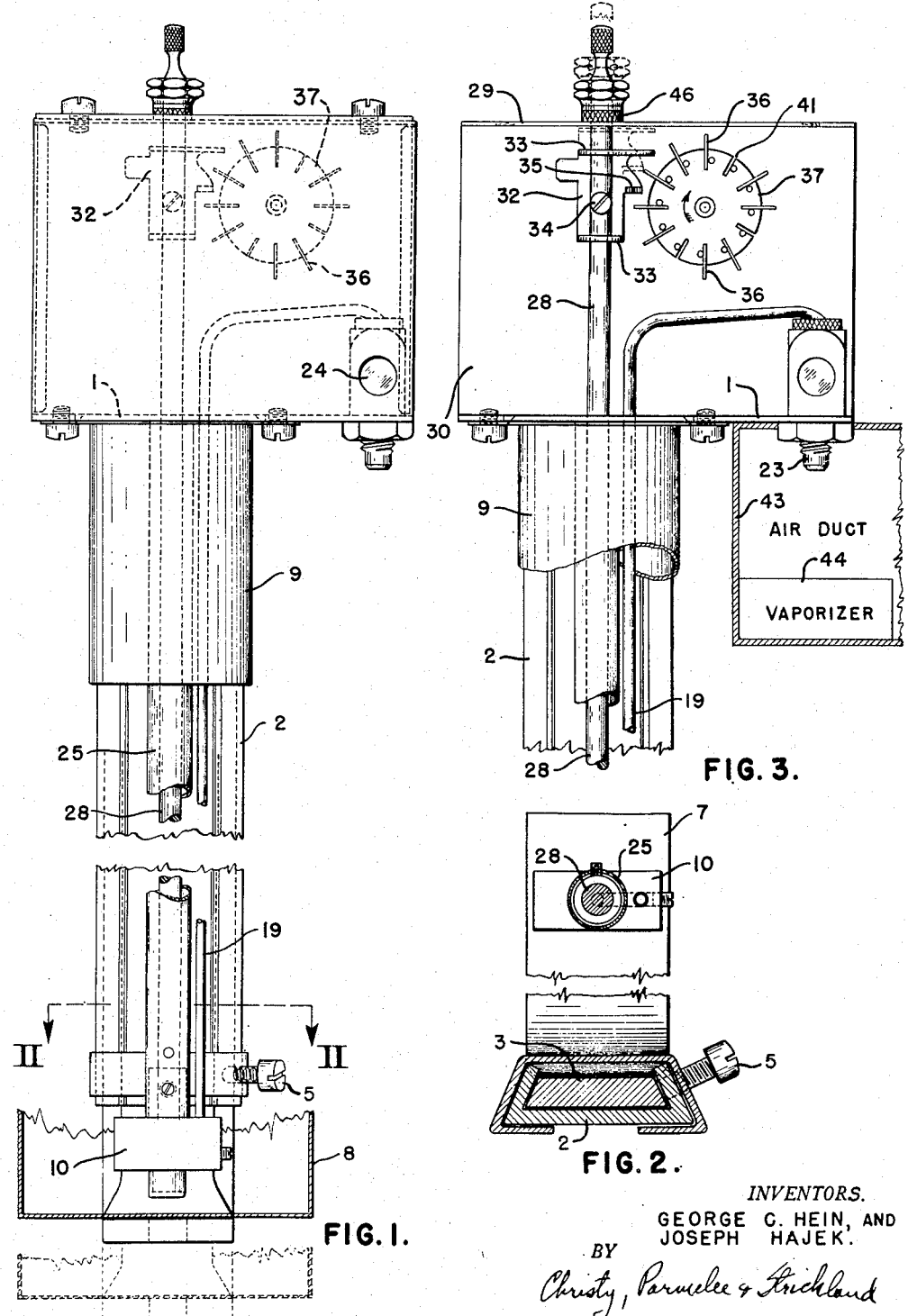
INVENTORS.
GEORGE C. HEIN, AND
JOSEPH HAJEK.
BY Christy, Parmelee & Strickland
ATTORNEYS

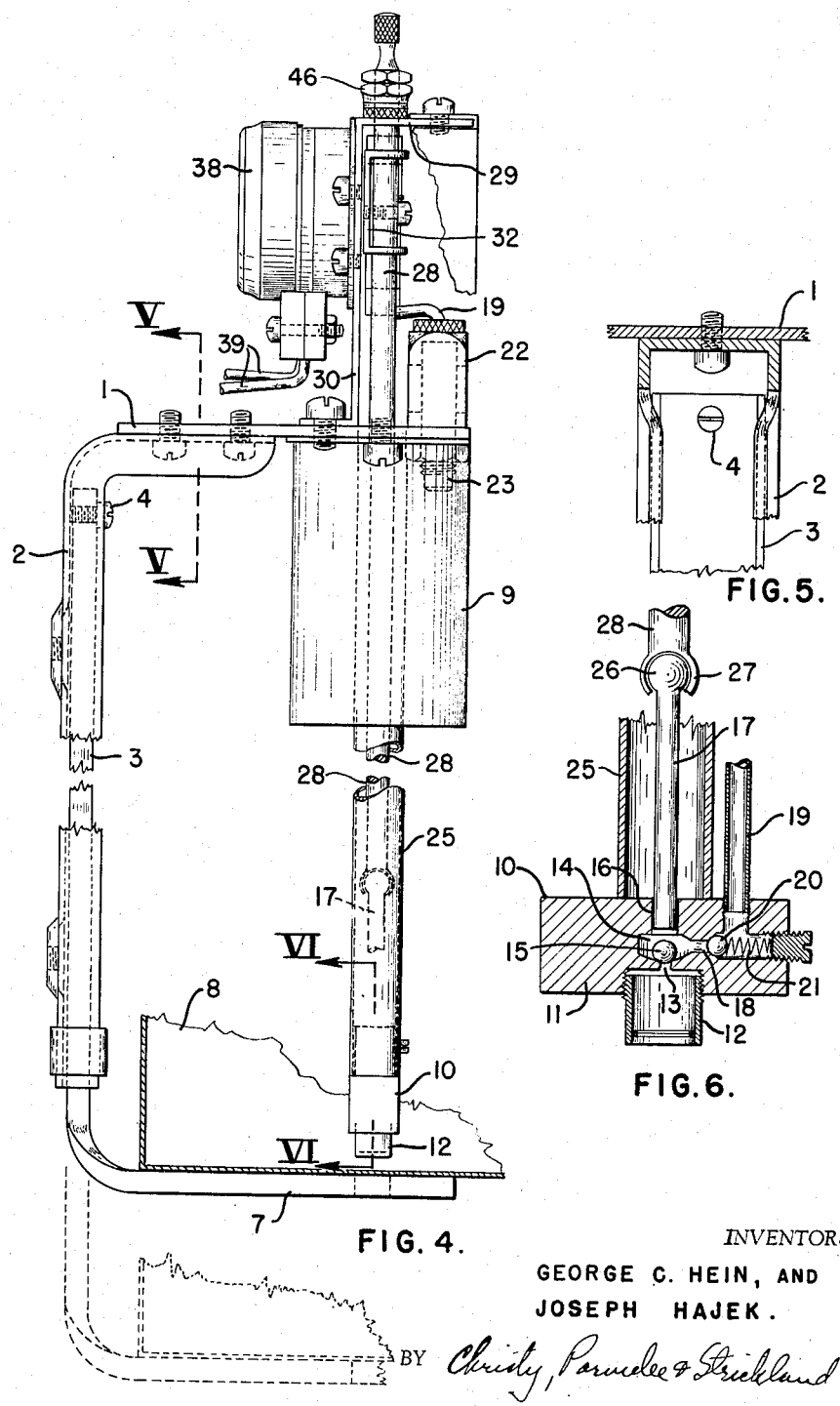

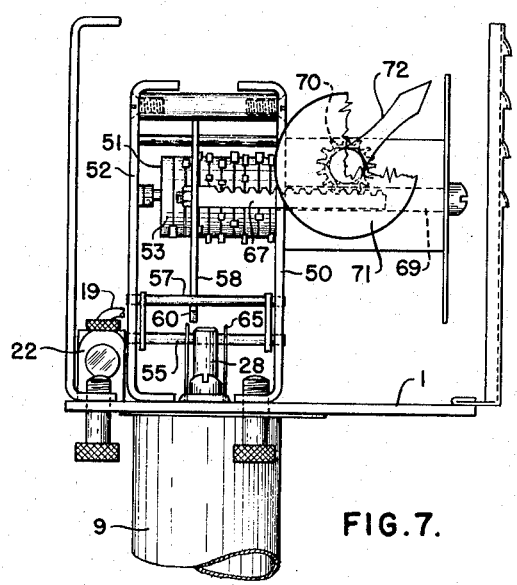
FIG.7.
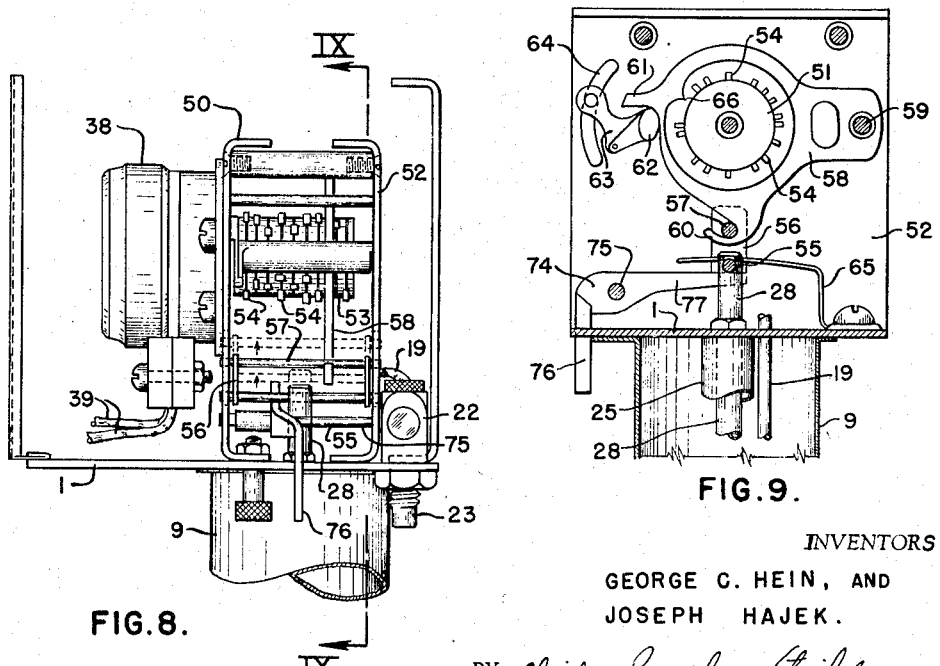
FIG.8.
FIG.9.
INVENTORS
GEORGE C. HEIN, AND
JOSEPH HAJEK.
BY *Christy, Parmelee & Strickland*
ATTORNEYS Patented Jan. 5, 1954

2,664,604

UNITED STATES PATENT OFFICE 2,664,604

AIR CONDITIONING APPARATUS AND LIQUID METERING DEVICE

George C. Hein and Joseph Hajek, Mars, Pa.; said Hajek assignor to said Hein

Application January 21, 1950, Serial No. 139,948

10 Claims. (Cl. 21—74)

1

This invention relates generally to a liquid metering device, and, more particularly, to air conditioning apparatus having novel structure for feeding measured amounts of glycol in a timed periodic manner to a vaporizer for dissemination in an atmosphere to be sterilized.

The properties of di-ethylene and tri-ethylene glycol vapors with respect to their sterilizing effect on air are well-known, and the desirability for incorporating mechanism in air conditioning apparatus for disseminating glycol vapor into the air has been recognized. For sterilizing purposes, an extremely small proportion of glycol vapor to air, in the nature of about one part glycol to several thousand parts air, is required. Due to the fact that glycol loses its sterilizing properties when subjected to too high a temperature, special vaporizing apparatus must be employed for converting the glycol into a vapor. This apparatus commonly is in the form of an electric heater to which the glycol is fed and includes temperature limiting devices or is so constructed that the liquid glycol will not be subjected to an excessive temperature.

The problem of delivering the glycol to the vaporizing apparatus in a proper amount has presented considerable difficulty. Gravity feeds in which the flow of fluid is regulated by a control valve have not performed satisfactorily since the flow is influenced by factors other than the setting of the control valve. In such cases, the flow will vary with temperature conditions effecting the viscosity of the glycol, and will additionally vary with the depth of the glycol in the reservoir from which it is being fed. These variations consequently may result in feeding an amount insufficient to sterilize the air properly, or an amount such that the operation of the vaporizer will be interfered with. Moreover, feed systems of this character have the further disadvantage of requiring the vaporizer to be located in a position vertically below that of the glycol reservoir thereby preventing its location in an air duct where there is no space above the duct for the mounting of a glycol supply tank.

One of the principal objects of this invention is to provide a liquid metering device which is operable to deliver a predetermined quantity of fluid in a predetermined period of time.

Another object of the invention is to provide a liquid metering device which is adjustable to deliver a quantity of glycol to air conditioning apparatus corresponding to the volume of air being handled by the air conditioning apparatus.

2

A still further object of the invention is the provision of a liquid metering device for feeding glycol to air conditioning apparatus in which the supply of the glycol may be located at an elevation below that to which the glycol is being fed.

Still another object of the invention is to provide a novel arrangement of pumping mechanism in a liquid metering device.

A still further object of the invention is to provide a liquid metering device with a pump and a novel timed drive for operating the pump so that it will deliver a predetermined quantity of fluid in a given period of time.

Other objects and advantages of the invention will be apparent from the following description.

In the drawings, there is shown a preferred embodiment of the invention with two modified forms of a mechanical transmission for connecting the pumping mechanism to an electrical drive motor. In this showing:

Fig. 1 is a front elevational view of a liquid metering device constructed in accordance with the principles of this invention, a portion of the structure being broken away and the supply tank being shown in fragmentary section;

Fig. 2 is a sectional view taken substantially along the line II—II of Fig. 1;

Fig. 3 is a partial view similar to Fig. 1, with the housing of part of the mechanism removed and illustrating the application of the apparatus to an air duct shown in section with a vaporizer indicated diagrammatically therein;

Fig. 4 is a side elevational view of the structure shown in Fig. 1;

Fig. 5 is a sectional view taken substantially along the line V—V of Fig. 4;

Fig. 6 is a sectional view taken substantially along the line VI—VI of Fig. 4;

Fig. 7 is a fragmentary side elevational view illustrating a modified form of apparatus;

Fig. 8 is a side elevational view from an opposite side of the structure shown in Fig. 7; and Fig. 9 is a sectional view taken substantially along the line IX—IX of Fig. 8.

Referring first to Figs. 1 through 4 of the drawings, the numeral 1 designates a supporting plate having a bracket 2 secured to the underside thereof. As best shown in Fig. 2, the bracket 2 has a dove-tail shape and has an elongated member 3 mounted therein so as to provide supporting structure which is adjustable in a vertical direction with respect to the supporting plate 1. Set screws 4 and 5 are provided for securing the member 3 in its various extended positions with respect to the bracket 2. The lower end of the supporting member 3 is bent outwardly to provide a horizontal support 7 for a can 8 or other container in which a supply of glycol may be stored. The support has a cylindrical part 9 secured to the underside thereof which is adapted to enter the opening in the can 8 and functions mainly to hold the can 8 against movement with respect to its support and the liquid metering device. The can 8 is preferably a rectangular can of the type commonly designated as one gallon oil cans, and having a circular opening in the top thereof in which the part 9 may be received.

In order to pump glycol in the container 8, a pump indicated as a whole by the numeral 10 is provided. The pump comprises a block 11 having an inlet tube 12 depending therefrom and connected with an inlet port 13. The inlet port 13 communicates with a pumping chamber 14, and a ball check valve 15 having a gravity bias is provided for controlling the connection of the port 13 to the chamber 14. The block is provided with a cylindrical opening 16 forming a pumping cylinder in which the end of a rod 17 is slideably received. The end of the rod 17 in the cylinder 16 functions as a piston in a manner to be described. Chamber 14 is provided with an outlet port 18 for connecting the chamber 14 with an exhaust conduit 19. A ball check valve 20 controls the connection of the exhaust port 18 with the outlet conduit 19, and a spring 21 is provided for biasing the check valve 20 to a closed position. The outlet conduit 19 delivers the fluid to a supply connection 22 having an outlet nipple 23 through which delivery of the fluid is made. The supply connection 22 is provided with a window 24 through which the fluid being supplied to the nipple 23 may be viewed. A tube 25 extends between the support 1 and pump 10 and operates to secure the pump 10 to the support 1.

In order to reciprocate the pump rod 17 for the purpose of operating the pump 10 to deliver fluid through the conduit 19, the upper end of the rod 17 is enlarged as at 26 to provide a connection to actuating mechanism. The enlarged end 26 is spherical in shape, and is fitted in a similarly shaped recess 27 at the lower end of an actuating rod 28. Upon reciprocating movement being imparted to the pump rod 28 in a manner to be described, a similar movement will be imparted to the rod 17 which will operate to pump fluid through the conduit 19. The connection provided by the parts 26 and 27 is particularly desirable in that it permits the reciprocation of the pump rod 17 without the transmission of bending or angular movements of the rod 28 thereto. The rod 28 has a guided sliding movement through an opening in the support 1, and has its upper end extending through an opening in a horizontal bracket 29 constituting part of a bracket 30 secured to the support 1. The rod 28 thus has a guided sliding movement through the parts 1 and 29 at spaced points, and its movement is thus limited to a guided reciprocating movement in a vertical direction.

To actuate the rod 28, an actuating member 32 having spaced flanges 33 with openings therein through which the rod 28 extends is secured to the rod 28 by a set screw 34. The member 32 is provided with an actuating flange 35 which is positioned in the path of movement of tines 36 secured to an operating wheel 37. The wheel 37 is rotatably supported on the bracket 30 and is driven by an electric motor 38. The motor 38 is preferably a conventional clock motor of the alternating current synchronous type and has leads 39 for connection to a source of alternating current. The tines 36 are rectangular in shape and are receivable in slots 41 cut in the periphery of the wheel 37. Upon rotation of the wheel 37, the tines 36 strike the flange 35 and raise the rod 28, the path of movement of the rod being tangential to the arcuate path of movement of the tines 36. As rotation is continued, the tines 36 move from underneath the flange 35, and the rod 28 and connected parts then gravitate downwardly to a position in which they may be actuated again by the next successive tine 36. The motor 38 operates the wheel 37 at a constant speed, and the rod 28 will be operated as many times per revolution of the wheel 37 as there are tines 36 thereon. If only one of the slots 41 is provided with a tine 36 therein, the rod 28 will be reciprocated once for each revolution of the wheel 37. The wheel 37 and tines 36 constitute a mechanical transmission between the electric motor 38 and rod 28, and the speed ratio of this transmission may be readily varied by changing the number of tines on the wheel 37.

When the rod 28 is lifted upwardly by a tine 36, the piston rod 17 will move upwardly and fluid will flow into the chamber 14, the ball check valve 15 moving to an unseated position for this purpose. When the rod 17 moves downwardly, valve 15 will seat, and the valve 20 will unseat, and a quantity of fluid dependent upon the length of the down stroke of the rod 17 will be forced into the delivery conduit 19.

As shown in Fig. 3, the support 1 is secured in position with respect to an air duct 43 having a vaporizer 44 mounted therein. The vaporizer 44 is positioned underneath the delivery nipple 23 and the fluid forced through exhaust conduit 19 is delivered to the nipple 23 from which it flows by gravity to the vaporizer 44. The vaporizer 44, of course, may be of any suitable construction, and operates in conventional manner to vaporize the glycol delivered thereto. The glycol vapor is mixed with the air passing through the conduit 43 and sterilizes such air. The amount of glycol delivered to the vaporizer 44 is a regulated quantity which is proportioned to the air passing through the conduit 43 so that a sufficient amount of vapor will be produced to sterilize the air passing therethrough.

In the operation of the pump as described above, gravity is relied on to move the piston 17 in a downward direction for its pumping stroke. However, it will be understood that a spring may be employed as an additional bias to increase the force of the pumping stroke in the event that gravity is insufficient for this purpose.

As pointed out above, the number of pumping strokes of the pump in a given period of time may be varied by changing the number of tines mounted on the wheel 37. By varying the number of tines to vary the rate of operation of the pump, the quantity of fluid delivered to the supply nipple 23 in a given period of time will be varied. For any given number of tines 36 on the wheel 37, a further adjustment of the quantity of fluid delivered may be varied by adjusting the length of the stroke of the piston rod 17. For this purpose, the upper end of the rod 28 has a threaded connection with a nut 46 which abuts against the bracket 29 in the area about the opening through which the rod 28 extends. The abutting engagement of the nut 46 with the bracket 29 thus limits the downward movement of the rod 28 and thereby the distance which the piston rod 17 moves into the opening 16 in its pumping stroke. By adjusting the position of the nut 46 with respect to the rod 28, the effective pumping stroke of the piston 17 may be changed to vary the quantity of fluid being delivered through the conduit 19 to the nipple 23 and the vaporizer 44. It will thus be seen that the speed change transmission comprising the wheel 37 and tines 36 varies the quantity of fluid delivered by varying the rate of operation of the pump 10. For any given rate of operation of the pump 10, a further adjustment of the quantity of the fluid being delivered may be made by adjustment of the nut 46 to vary the pumping action of the pump 10.

In Figs. 7 through 9, there is shown a modified form of transmission mechanism for operating the pump from the synchronous electric clock motor together with a modified form of apparatus for adjusting the stroke of the pump. The other parts of the metering device are essentially the same, and like parts have been designated by like numerals. In this modification, the supporting plate 1 and the structure below the plate 1 including the cylindrical part 9, pump rod 28, pump connecting tube 25, and the remainder of the structure below the supporting plate 1 are substantially the same as described above. The drive motor 38 is mounted on a bracket 50 secured to the support 1 and operates a speed change mechanism, indicated as a whole by the numeral 51, which is rotatably carried by the bracket 50, and a second bracket 52 also secured to the support 1. As best shown in Figs. 7 and 8, the transmission mechanism 51 comprises a plurality of concentric discs 53 having actuating members 54 mounted in spaces provided between adjacent discs. There are a different number of actuating discs 54 between each pair of adjacent discs 53. As viewed in Fig. 8, the number of actuating members 54 between the discs increases from right to left as viewed in Fig. 8, there being one actuating member between the first pair of discs and the number of actuating members between successive pairs increases by one for each pair, so that there are ten actuating members between the last pair of discs. The actuating members 54 effect a pumping stroke in a manner to be described. To actuate the pump, the upper end of the pump rod 28 is pivotally connected to the cross bar 55 of an actuating frame 56 having guide parts extending from the ends of its cross bars 55 and 57 which project through slots not shown in the brackets 50 and 52 so as to have a guided sliding and vertical movement therein. The frame 56 is actuated vertically by a lever 58 which is pivoted on a rod 59 and has a hook 60 engaged under the cross bar 57 of the frame 56. The lever 58 has a stop lug 61 projecting therefrom for engagement with an adjustable stop member 62 to limit downward pivotal movement thereof as viewed in Fig. 9. The stop member 62 is secured to a bracket 63 which is adjustable in a slot 64 for adjusting the position of the member 62. This adjustment limits downward pivotal movement of the lever 58 and thereby adjusts the vertical stroke of the pump rod 28. The frame 56 and pumping parts gravitate downwardly for a pumping stroke, and a spring 65 is engaged with the cross bar 55 to provide additional bias or force for the pumping stroke.

To actuate the frame 56 and the pump rod 28 upwardly, the lever 58 has a camming member 66 which is adapted to be actuated by the members 54 carried by the transmission member 51. When a member 54 engages with the cam 66, the lever 58 is pivoted upwardly to raise the frame 56 and pump rod 28. As the member 54 moves out of engagement with the cam 66, the lever 58, frame 56, and pump rod 28 are released for downward movement to effect a pumping stroke. The lever 58 is pivotally supported by the shaft 59 and has a sliding support on the adjusting member 62. It is shiftable axially to position the camming member 66 for actuation by the members 54 between selected pairs of the discs 53. By positioning the lever 58 between a selected pair of discs 53, the lever 58 will be cammed upwardly as many times per revolution of the structure 51 as there are actuating members 54 between the pair of discs selected. In this manner, the lever 58 and pump will be operated 1, 2, 3, etc., times per revolution according to the number of actuating members between the discs selected.

For actuating the lever 58 axially, it is secured to one end of a rack 67, the rack having a guided sliding movement in an opening in a block 69 secured to the bracket 50. A pinion 70 is in meshing engagement with the rack 67 and is operated manually by a hand wheel 71 to effect lateral movement of the lever 58. A pointer 72 connected to the hand wheel is employed for indicating the relative axial position of the lever 58 and may be used to indicate the number of times such lever will be operated per revolution of the transmission mechanism 51.

A manually operable bell crank lever 74 is pivotally mounted on a rod 75 extending between the brackets 50 and 52. The lever 74 has one arm 76 which is manually operable and its other arm 77 is engaged with the underside of the cross bar 55. When inward pressure is applied to the lever 76, the lever 77 will move the frame 56 and pump parts upwardly against the force of gravity and the bias of the spring 65, and when the force is released from the lever 76 the parts will move downwardly to effect a pumping stroke. The lever 74 provides a manually operable priming device for operating the pump to fill the conduit 19 and to start fluid flowing to the nipple 23.

The operation of the modified structures shown in Figs. 7 through 9 is essentially the same for that described in connection with the preceding figures. The speed change transmission 51 is first adjusted by rotation of the hand wheel 71 to give the desired rate of operation of the pump and thereby roughly determine the quantity of glycol which will be delivered to the nipple 23 in a given predetermined period of time. Thereafter, the position of the member 62 may be varied to obtain an additional adjustment or regulation of the quantity of fluid being pumped for the selected adjustment of the transmission 51. As explained above, changing the position of the stop member 62 regulates the amount of pivotal movement of the lever 58 in a counterclockwise direction and thus varies the length of the pumping stroke.

In operation, the support 1 is first secured in position with respect to an air duct 43 as shown in Fig. 3 with the nipple 23 in a position to deliver glycol to the vaporizer 44. The extensible support 3 is then lowered with respect to the bracket 2 to a position in which a can 8 containing glycol may be mounted with its bottom part on the horizontal supporting member 7. The can 8 and support 7 are then moved to lower the tube 25 and pump 10 relatively through the opening customarily provided in the top of the container 8. The upward movement of the container 8 is continued until its top opening has the cylindrical member 9 positioned therein as explained above. The set screws 4 and 5 are then operated to secure the parts in their relative positions shown in Figs. 1 through 4. In this position, the inlet 12 of the pump 10 will be positioned adjacent the bottom of the container 8, and the pump will be operable to deliver fluid to the nipple 23 which may be at any level desired for any given installation to be made.

At this point, attention is particularly invited to the fact that the speed change transmissions 37 or 51 may be adjusted to vary the rate of the pump operation and thereby the quantity of fluid delivered to the outlet 23 in a given period of time. The provision for adjusting the effective length of the pumping stroke of the pump rod 20 enables a finer adjustment of the quantity of fluid being delivered for any given adjustment of the speed change transmissions 37 or 51.

These adjustments enable a regulation of the quantity of fluid being delivered in a given period of time so that such quantity will bear a predetermined relation to the quantity of air being delivered through a given air duct. The quantity of fluid thus being delivered is not dependent upon the setting of adjustable valve mechanism, and will not vary with the level of fluid in the container 8 or with changes in ambient temperature. Once adjustment has been made to regulate the quantity of fluid being delivered, the apparatus will function to deliver such quantity thereafter without change.

While we have illustrated and described certain specific embodiments of our invention, it will be understood that this is merely by way of illustration, and that various changes and modifications may be made therein within the contemplation of our invention and under the scope of the following claims.

We claim:

1. In air conditioning apparatus, an air duct having a glycol vaporizer therein, and liquid metering means for supplying glycol to said vaporizer comprising a container for the glycol, a pump in said container, a conduit for delivering glycol from said pump to the vaporizer, and a timed drive for operating said pump to meter the flow of glycol through the conduit.

2. In air conditioning apparatus, an air duct having a glycol vaporizer therein, and liquid metering means comprising a pump for supplying glycol to said vaporizer, and an electric clock motor providing a timed drive for operating said pump to deliver a predetermined amount of fluid in a given time period to said vaporizer.

3. In air conditioning apparatus, an air duct having a glycol vaporizer therein, and liquid metering means comprising a pump for supplying glycol to said vaporizer, and an electric clock motor providing a timed drive for operating said pump to deliver a predetermined amount of fluid in a given time period to said vaporizer, and adjustable means for varying the amount of fluid delivered by said pump in said given time period.

4. In air conditioning apparatus, an air duct having a glycol vaporizer therein, and liquid metering means comprising a pump for supplying glycol to said vaporizer, said pump having a pumping cylinder with a piston reciprocable therein, an electric motor providing a timed drive for reciprocating said piston at a predetermined rate, and means for adjusting the stroke of the piston to vary the quantity of glycol delivered in a given time period.

5. In air conditioning apparatus, an air duct having a glycol vaporizer therein, and liquid metering means comprising a pump for supplying glycol to said vaporizer, said pump having a pumping cylinder with a piston reciprocable therein, an electric motor providing a timed drive for reciprocating said piston at a predetermined rate, means for adjusting the stroke of the piston to vary the quantity of glycol delivered in a given time period, and a speed change transmission connecting said motor with said pump for varying the rate at which said piston is reciprocated.

6. In air conditioning apparatus, an air duct having a glycol vaporizer therein, and liquid metering means comprising a pump for supplying glycol to said vaporizer, an electric drive motor, and a speed change transmission connecting said motor with said pump for varying the quantity of glycol delivered by the pump in a given time period.

7. In air conditioning apparatus, an air duct having a glycol vaporizer therein, and liquid metering means comprising a pump for supplying glycol to said vaporizer and having a rectilinearly movable actuating rod, an electric drive motor, a wheel rotated at a constant speed by said motor, a plurality of tines mounted on said wheel, and an actuating member in the path of movement of said tines for actuating said rod once per revolution of each tine on said wheel, said tines being removable so that the number of tines on the wheel may be varied to vary the rate of operation of the pump.

8. In air conditioning apparatus, an air duct having a glycol vaporizer therein, and liquid metering means, comprising a pump for supplying glycol to said vaporizer and having a rectilinearly movable actuating rod, an electric drive motor, a speed change transmission comprising a rotatable member operated at a constant speed by said motor and having a plurality of sets of cams thereon, each of said sets having a different number of cams, an actuating member shiftable to different positions operatively related to selected ones of said sets for operation by the cams therein so that its rate of operation will be determined by the number of cams in the selected set, and means interconnecting said rod and member for effecting operation of the rod by said member.

9. In air conditioning apparatus, an air duct having a glycol vaporizer therein, and means for supplying glycol to said vaporizer comprising a bracket having a cylinder depending therefrom with a pump rod and delivery conduit extending downwardly therethrough, a pump at the bottom of said rod and conduit, a vertically adjustable support for a glycol container secured to said bracket for holding the container in a position with said cylinder extending into the mouth of the container and said pump immersed in the liquid therein, an electric clock motor operable at a constant rate of speed, and a speed change transmission connecting said rod and motor for operating said rod at selectively variable rates to vary the quantity of glycol being supplied to the vaporizer by the pump.

10. In air conditioning apparatus, an air duct having a glycol vaporizer therein, and means for supplying glycol to said vaporizer comprising a bracket having a cylinder depending therefrom with a pump rod and delivery conduit extending downwardly therethrough, a pump at the bottom of said rod and conduit, a vertically adjustable support for a glycol container secured to said bracket for holding the container in a position with said cylinder extending into the mouth of the container and said pump immersed in the liquid therein, an electric clock motor operable at a constant rate of speed, a speed change transmission connecting said rod and motor for operating said rod at selectively variable rates to vary the quantity of glycol being supplied to the vaporizer by the pump, and means for varying the stroke of the pump to vary the quantity of fluid being delivered by the pump for a given rate of operation thereof by said transmission.

GEORGE C. HEIN.
JOSEPH HAJEK.

References Cited in the file of this patent

UNITED STATES PATENTS

| Number | Name | Date |
|---|---|---|
| 1,964,028 | Boynton et al. | June 26, 1934 |
| 2,168,850 | Towler et al. | Aug. 8, 1939 |
| 2,173,207 | Larsson | Sept. 19, 1939 |
| 2,360,321 | Griswold | Oct. 17, 1944 |
| 2,371,044 | Folmer | Mar. 6, 1945 |
| 2,372,324 | Hauser | Mar. 27, 1945 |
| 2,472,011 | Graham | May 31, 1949 |
| 2,523,371 | Jennings et al. | Sept. 26, 1950 |
| 2,523,373 | Jennings et al. | Sept. 26, 1950 |